US010414543B2

(12) United States Patent
Chezem

(10) Patent No.: US 10,414,543 B2
(45) Date of Patent: Sep. 17, 2019

(54) MULTI-DENSITY SKID ASSEMBLY

(71) Applicant: Haier US Appliance Solutions, Inc., Wilmington, DE (US)

(72) Inventor: Michael Thomas Chezem, Georgetown, IN (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 169 days.

(21) Appl. No.: 15/350,386

(22) Filed: Nov. 14, 2016

(65) Prior Publication Data

US 2018/0134445 A1 May 17, 2018

(51) Int. Cl.
| | | |
|---|---|---|
| *B65D 19/44* | (2006.01) | |
| *B65D 81/05* | (2006.01) | |
| *B65D 19/40* | (2006.01) | |
| *F16B 13/02* | (2006.01) | |

(52) U.S. Cl.
CPC ............. *B65D 19/44* (2013.01); *B65D 19/40* (2013.01); *B65D 81/054* (2013.01); *B65D 2519/00019* (2013.01); *B65D 2519/00034* (2013.01); *B65D 2519/00054* (2013.01); *B65D 2519/00064* (2013.01); *B65D 2519/00069* (2013.01); *B65D 2519/00273* (2013.01); *B65D 2519/00293* (2013.01); *B65D 2519/00323* (2013.01); *B65D 2519/00333* (2013.01); *B65D 2519/00562* (2013.01); *B65D 2519/00815* (2013.01); *B65D 2585/682* (2013.01); *B65D 2585/6817* (2013.01); *B65D 2585/6855* (2013.01); *F16B 13/02* (2013.01)

(58) Field of Classification Search
CPC ................ B65D 19/44; B65D 71/0092; B65D 2519/00815; F16B 13/02; B64D 2519/00079
USPC .............. 248/678, 680, 681, 346.03, 346.01; 411/508, 509, 510
See application file for complete search history.

(56) References Cited

U.S. PATENT DOCUMENTS

| | | | | |
|---|---|---|---|---|
| 2,559,930 | A * | 7/1951 | Bolton ............... | B65D 19/0012 108/57.1 |
| 2,716,532 | A * | 8/1955 | Wysong, Jr. ....... | B65D 71/0092 108/51.3 |
| 3,436,045 | A * | 4/1969 | Anspaugh ............. | A47B 17/02 206/320 |
| 3,575,288 | A * | 4/1971 | Brucken .............. | A47B 91/024 206/320 |
| 3,648,959 | A * | 3/1972 | Wagner ............. | B65D 19/0002 206/320 |
| 3,810,279 | A * | 5/1974 | Swick ................... | F16B 19/004 411/508 |
| 4,241,892 | A | 12/1980 | Morris | |
| 4,396,329 | A * | 8/1983 | Wollar ................. | F16B 21/084 24/614 |

(Continued)

*Primary Examiner* — Kimberly T Wood
(74) *Attorney, Agent, or Firm* — Dority & Manning, P.A.

(57) ABSTRACT

A multi-density skid assembly for an appliance or other object. The assembly includes an inner layer of at least one low density material and an outer layer of at least one high density material. At least one fastener extends into an inner opening defined in the inner layer and through an aperture defined by appliance. The fastener provides an anchoring force such that the fastener secures the skid assembly to the appliance yet allows for the skid assembly to be displaced from the appliance without the use of tools or necessarily laying the appliance on one side.

8 Claims, 8 Drawing Sheets

(56) References Cited

U.S. PATENT DOCUMENTS

| | | | | |
|---|---|---|---|---|
| 4,402,641 A * | 9/1983 | Arff | ................. | F16B 19/004 24/297 |
| 4,422,276 A * | 12/1983 | Paravano | ............ | B60R 13/0206 411/104 |
| 4,427,328 A * | 1/1984 | Kojima | ................. | F16B 21/084 24/625 |
| 4,568,215 A * | 2/1986 | Nelson | ................. | B29C 65/0672 24/297 |
| 4,776,739 A * | 10/1988 | Hamman | ................ | F16B 21/084 24/297 |
| 4,863,024 A * | 9/1989 | Booth | ................ | B65D 19/0016 206/386 |
| 5,180,134 A * | 1/1993 | Mallak | ..................... | B65G 7/02 108/55.1 |
| 5,270,108 A * | 12/1993 | Savoy | ................... | A01N 59/14 428/305.5 |
| 5,279,436 A * | 1/1994 | Elliott | ................. | B65D 88/528 206/321 |
| 6,026,754 A * | 2/2000 | Kohlhaas | ............ | B65D 19/0028 108/51.3 |
| 6,155,527 A * | 12/2000 | Muyskens | .......... | B65D 19/0002 108/51.3 |
| 6,264,157 B1 | 7/2001 | Muyskens | | |
| 7,896,601 B2 * | 3/2011 | Kalyanadurga | ....... | F16B 21/084 411/508 |
| 2005/0107233 A1 * | 5/2005 | Barton | ............... | B65D 19/0002 493/309 |
| 2007/0131147 A1 * | 6/2007 | Brubaker | ............. | B65D 85/68 108/56.1 |
| 2009/0308001 A1 * | 12/2009 | Wu | ......................... | E04B 1/762 52/173.3 |
| 2014/0090581 A1 * | 4/2014 | Schultz | ................ | F16F 15/067 108/57.12 |
| 2014/0096465 A1 * | 4/2014 | Amend | .................. | B29C 44/14 52/309.11 |

* cited by examiner

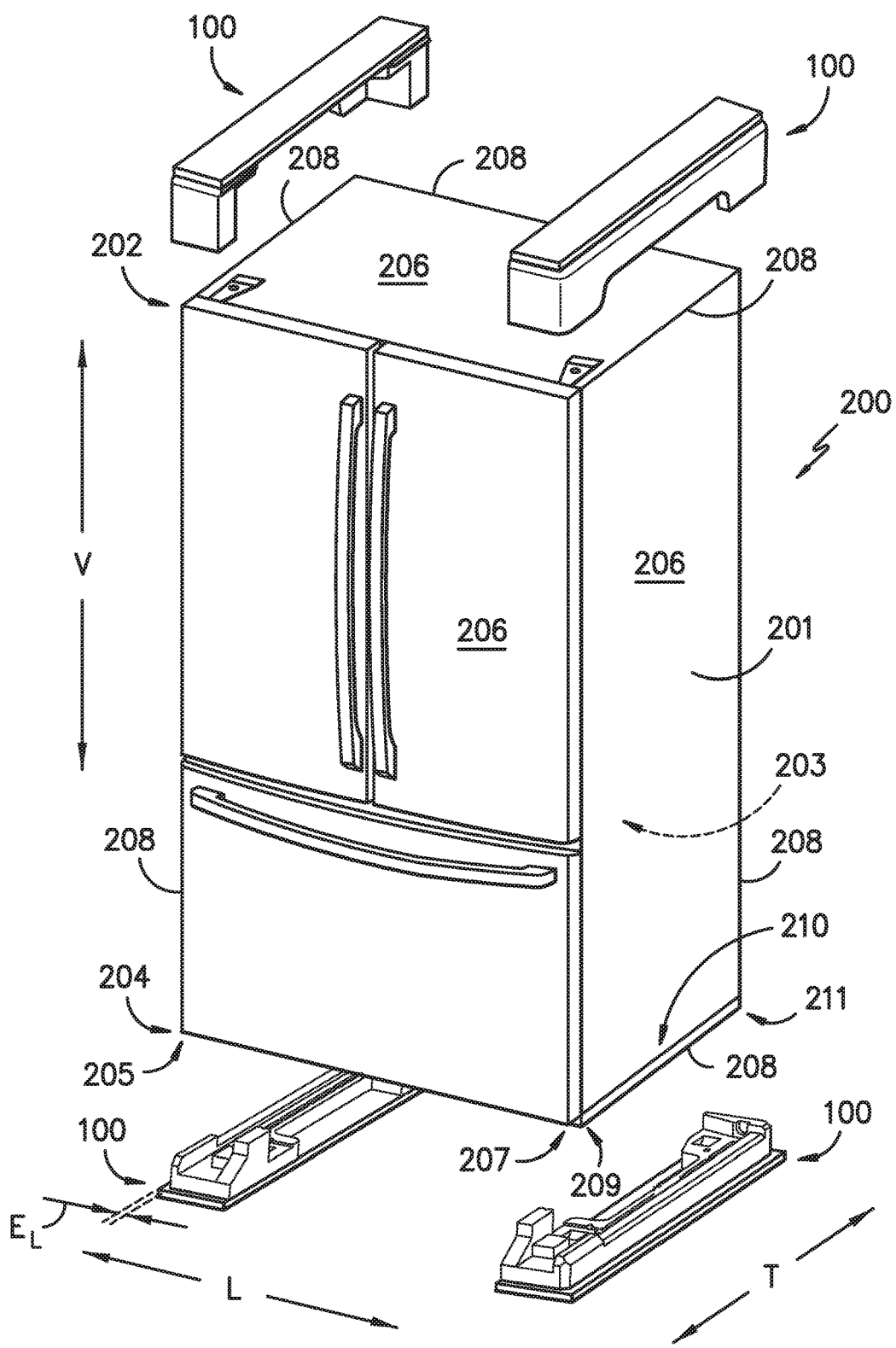
FIG. -1-

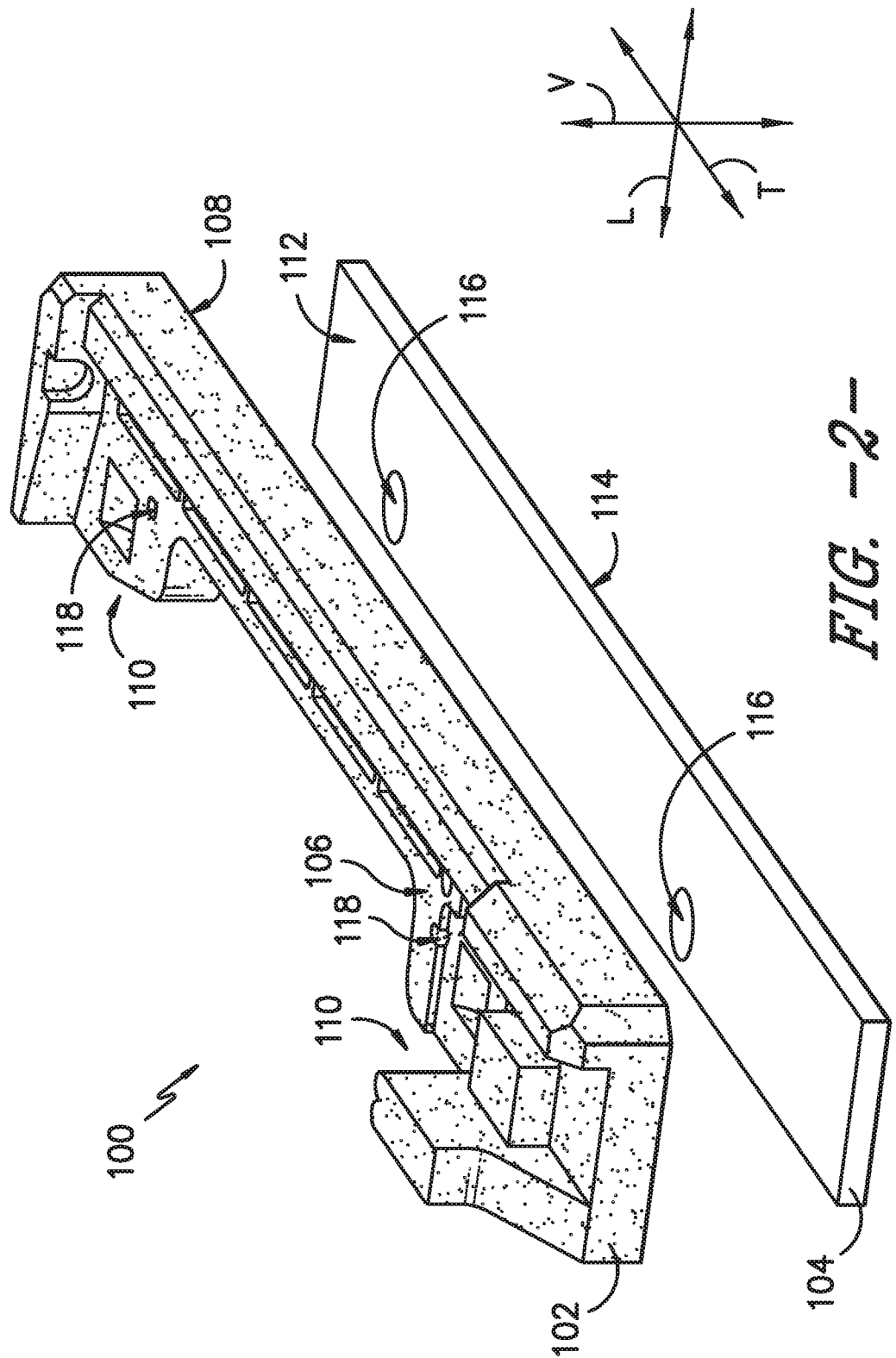
FIG. -2-

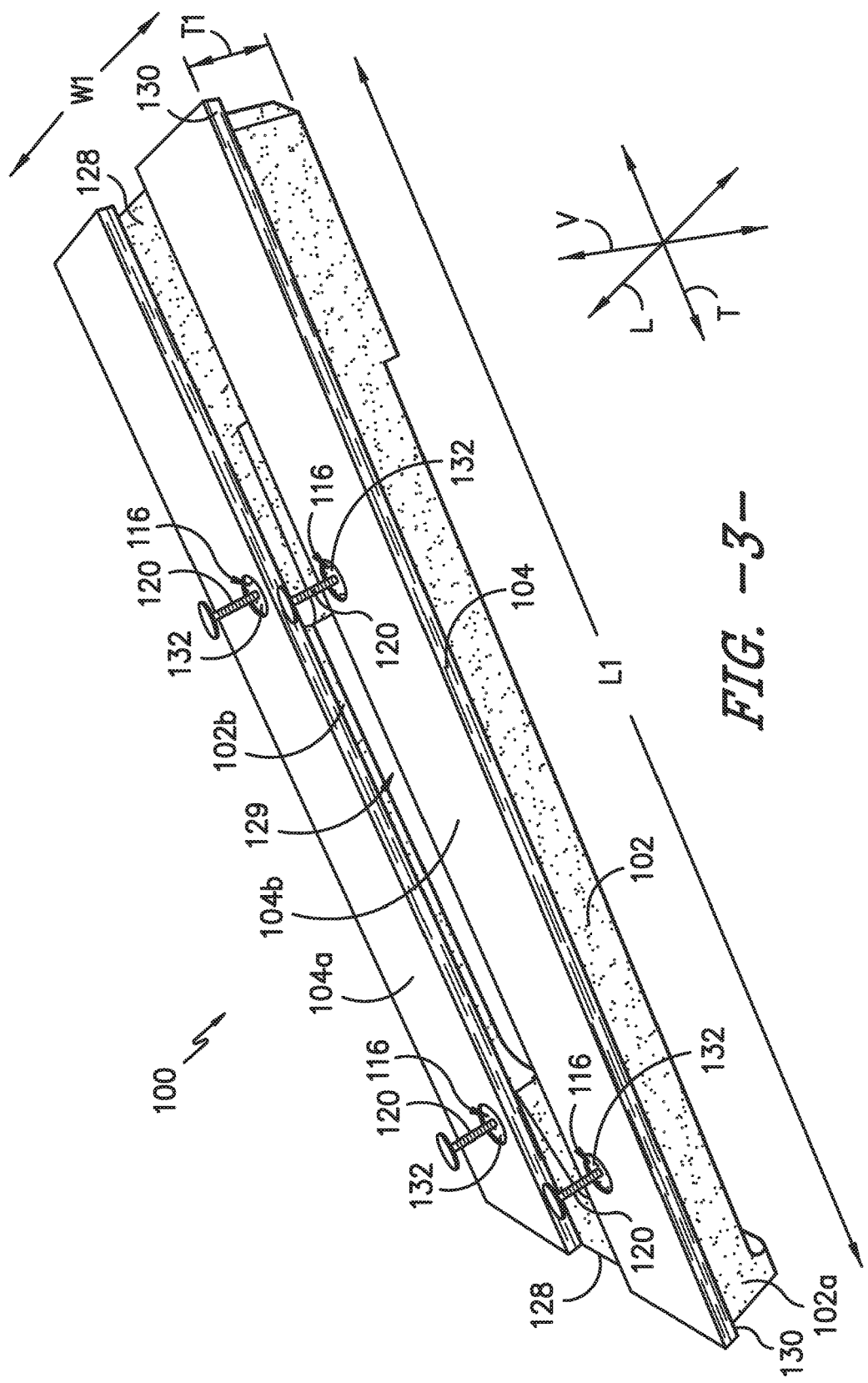
FIG. -3-

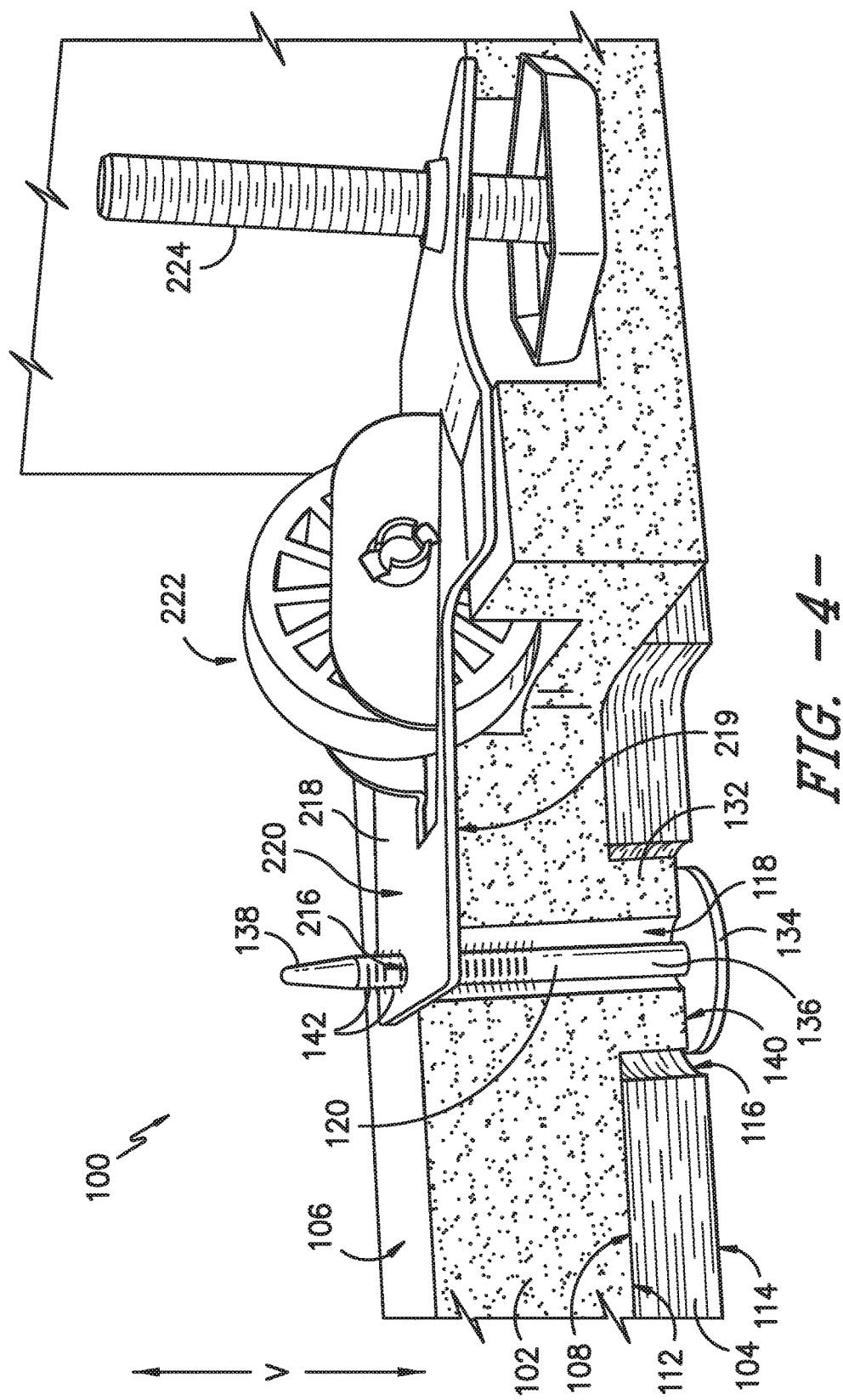
FIG. -4-

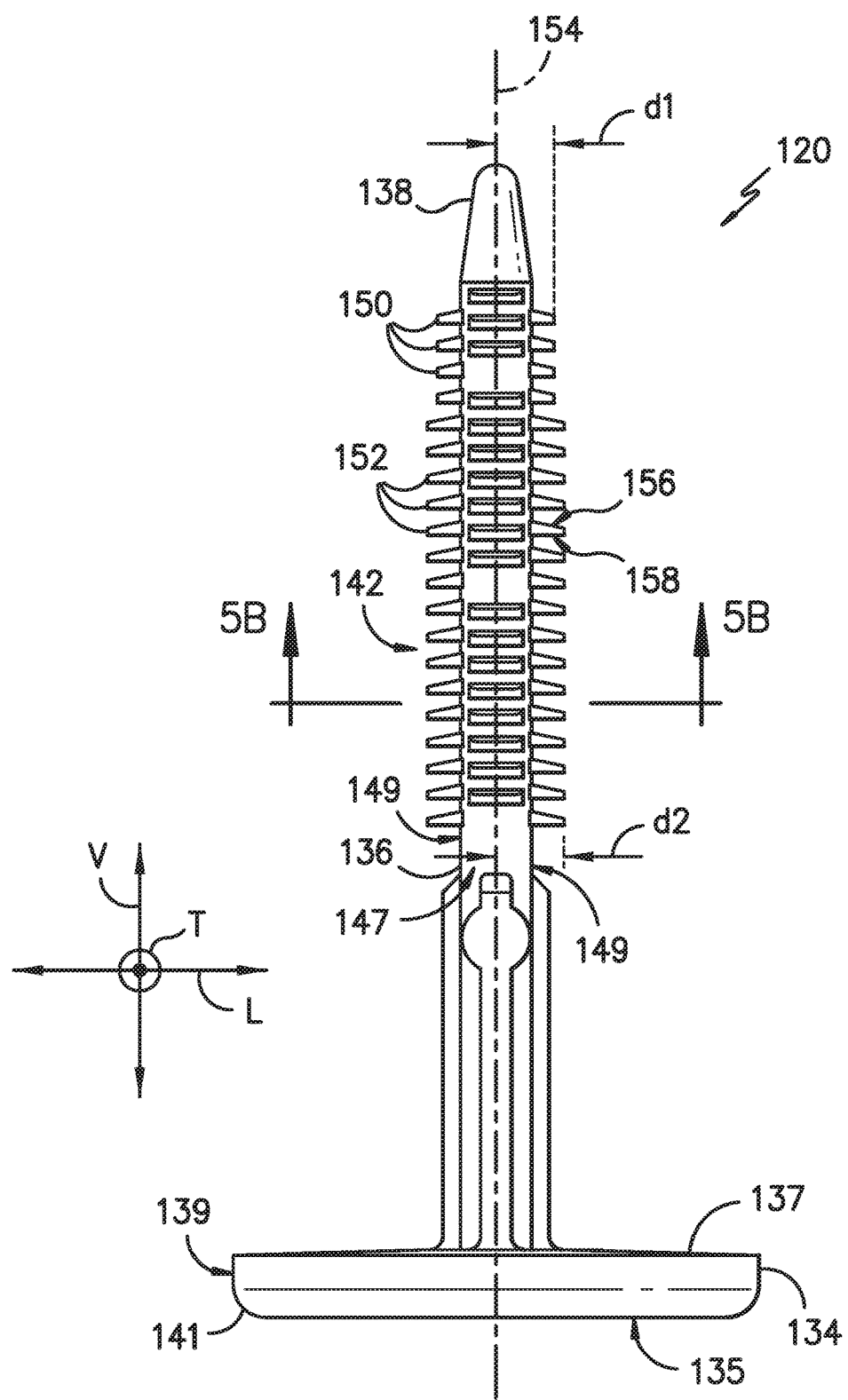
FIG. -5A-

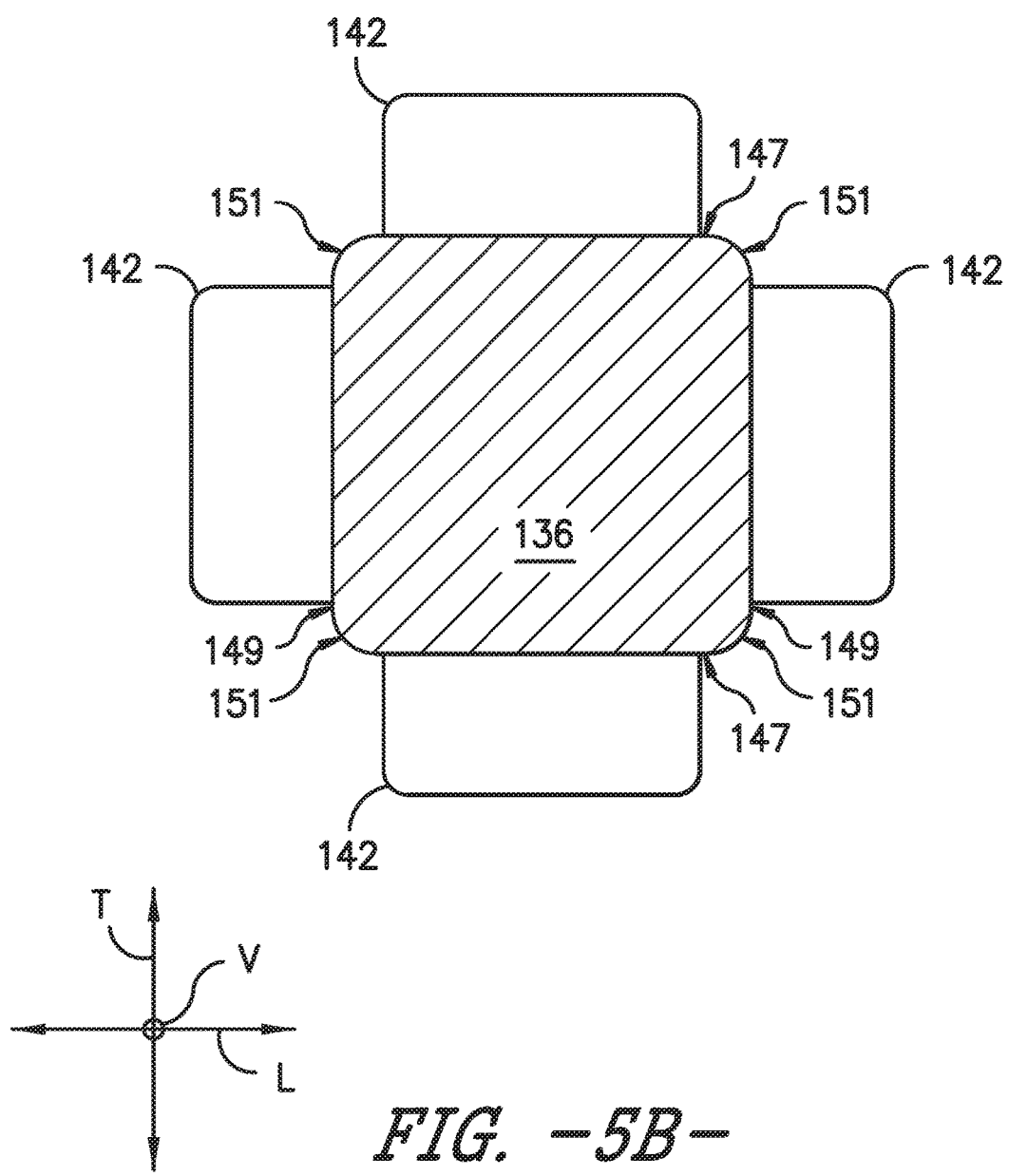
FIG. -5B-

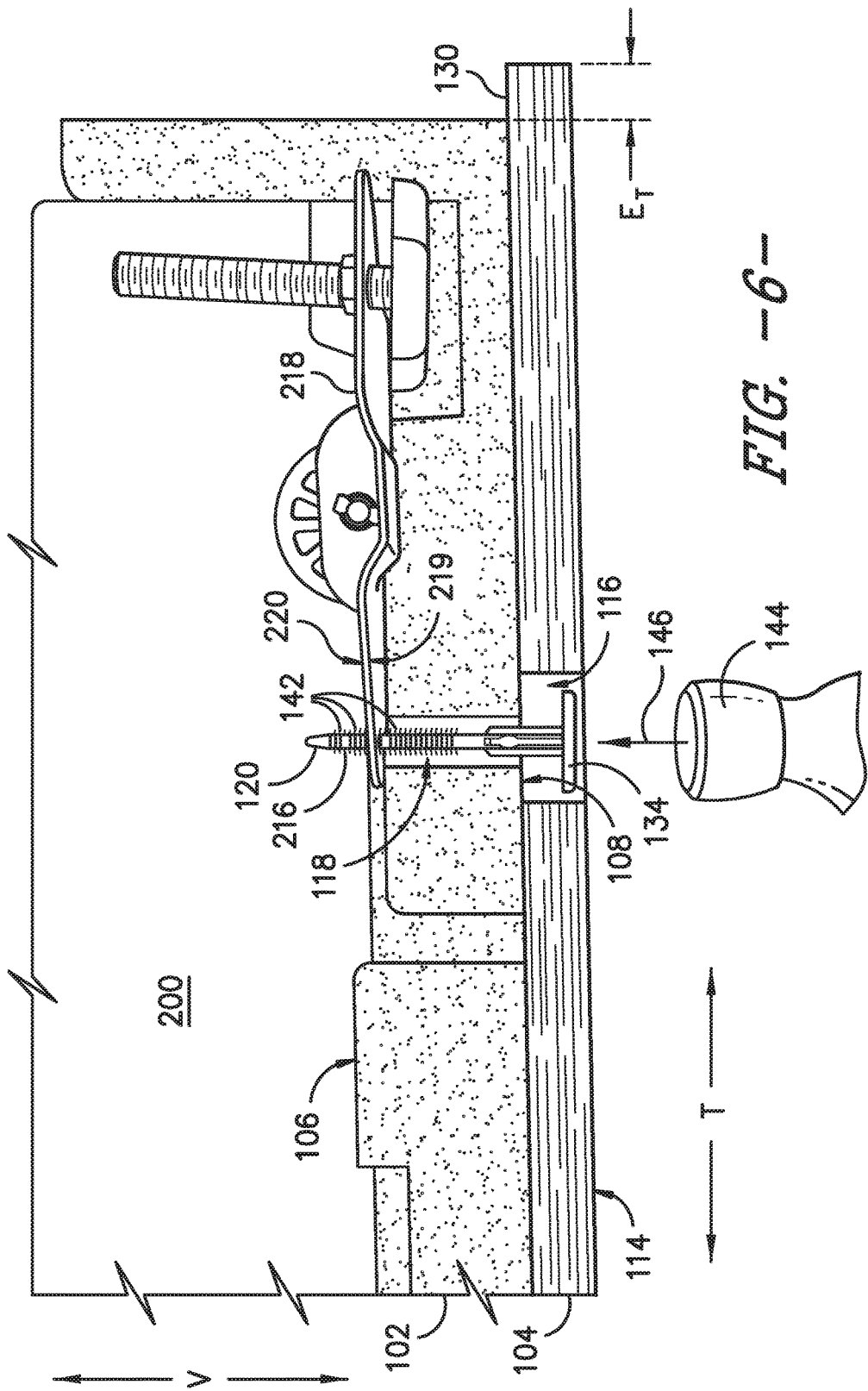

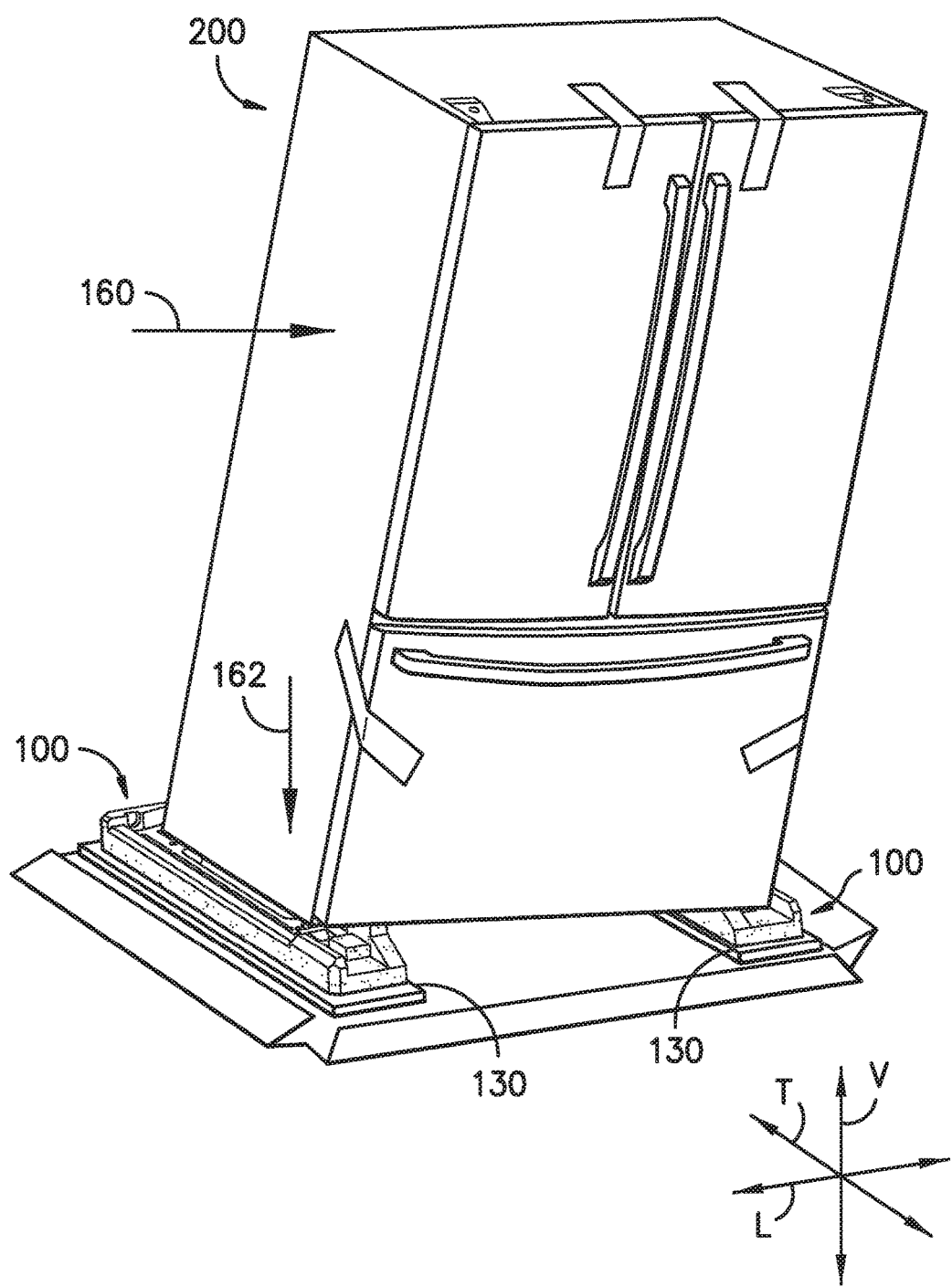
FIG. -7-

MULTI-DENSITY SKID ASSEMBLY

FIELD OF THE INVENTION

The subject matter of the present disclosure relates generally to skid assemblies for supporting and protecting appliances and other objects during product assembly, storage, and transport.

BACKGROUND OF THE INVENTION

Skid assemblies are used to support and cushion appliances during product assembly, storage, and transport. Exemplary appliances include refrigerators, freezers, dishwashers, stoves, washers, and dryers. Many other objects may also benefit from the use of skid assemblies during product assembly, storage, and transport, such as large industrial machines, machining equipment, and cabinetry.

During product assembly, for example, appliances are generally moved from one assembly station to the next, transported along conveyors, and stacked one on top of another. Conventional pallets, carriers, and skids are generally rigid but lack adequate cushioning to support an appliance as it moves about the factory. Appliances may experience significant shock loads as they are moved about the factory and/or during transport. Inadequate cushioning may cause damage to the appliance, leading to unnecessary waste and cost.

Conventional skids made of low density material provide more cushioning, but also may be ineffective for appliance support and protection during assembly, storage, and transport. For instance, when removing a skid assembly from an appliance, many times the skid is kicked or ripped away from the appliance, causing the low-density skid to break apart. The skid may then be unusable for future use. Moreover, when the appliance is stacked or dropped, the cushioning can become deformed as the skid may lack sufficient rigidity to adequately handle the load.

In addition, during assembly, appliances are typically not placed in a box or wrapped in shipping materials until the appliance is fully assembled. Thus, during assembly, the pallet, carrier, or skid is generally fixedly attached to the appliance to ensure that the pallet, carrier, or skid is not displaced from the appliance. In this way, the appliance is protected by the skid as it is moved about the factory. Typically, bolts, screws, or other mechanical means are used to attach the appliance to the pallet, carrier, or skid. For instance, screws can be fastened to a bracket of an appliance. When removing the pallet, carrier, or skid from the appliance, the appliance is typically laid on its side or up against another object so that the bolts, screws, or other mechanical means can be unfastened. Laying the appliance on its side or against another object can damage the appliance or object, especially where the appliance is prone to surface damage and dents.

Therefore, an improved skid assembly for supporting and protecting appliances during assembly, storage, and transport is needed. In particular, a multi-density skid assembly that provides cushioning and rigidity is desirable. Additionally, a skid assembly that provides adequate attachment to an appliance during assembly but is removable without tools and without necessarily laying the appliance on its side or against another object would be beneficial.

BRIEF DESCRIPTION OF THE INVENTION

Exemplary aspects of the present subject matter are directed to multi-density skid assemblies for an appliance or other object. The assembly includes an inner layer of at least one low density material and an outer layer of at least one high density material. At least one fastener extends into an inner opening defined in the inner layer and through an aperture defined by appliance. The fastener provides an anchoring force such that the fastener secures the skid assembly to the appliance yet allows for the skid assembly to be displaced from the appliance without the use of tools or necessarily laying the appliance on one side. Aspects and advantages of the invention will be set forth in part in the following description, or may be obvious from the description, or may be learned through practice of the invention.

One exemplary aspect of the present disclosure is directed to a skid assembly for an appliance. The appliance has at least one aperture for anchoring the skid assembly to the appliance. The skid assembly includes an inner layer and an outer layer. The inner layer is made of a low density material and has a first side and a second side opposite the first side, the first side contacts the appliance and is shaped to accommodate a portion of the appliance. The inner layer defines an inner opening extending through the inner layer and is aligned with the aperture of the appliance. The outer layer is made of a high density material and has a first side and a second side opposite the first side of the outer layer. The outer layer is adhered to the second side of the inner layer. The skid assembly further includes a fastener including a head, a shank extending from the head, and at least one anchor element extending outwardly from the shank. The fastener is configured to be inserted in the inner opening of the inner layer and through the aperture of the appliance so as to secure the skid assembly to the appliance.

In another exemplary aspect, optionally, the outer layer of the skid assembly defines an outer opening aligned with the inner opening in the inner layer, and the inner layer has a boss projecting into the outer opening.

In yet another exemplary aspect, the low density material of the inner layer is optionally an expanded polystyrene material and the high density material of the outer layer is optionally an oriented strand board material.

In another exemplary aspect, the skid assembly has a length and a width, and the outer layer optionally has an extension portion that extends further than the inner layer along at least one of the length and the width of the skid assembly.

Another exemplary aspect of the present disclosure is directed to an appliance including a skid assembly. The appliance includes an appliance housing defining a volume. Additionally, the appliance defines an aperture for anchoring the skid assembly to the appliance. The skid assembly includes an inner layer made of a low density material and has a first side and a second side opposite the first side. The first side is configured to contact the appliance and is shaped to accommodate a portion of the appliance. The inner layer defines an inner opening extending through the inner layer and is aligned with the aperture of the appliance. The skid assembly also includes an outer layer made of a high density material and has a first side and a second side opposite the first side of the outer layer. The outer layer defines an outer opening extending through the outer layer and is aligned with the inner opening. The outer layer is adhered to the second side of the inner layer. The skid assembly further includes a fastener including a head, a shank extending from the head, and at least one anchor element extending outwardly from the shank. The fastener is configured to be inserted in the outer opening of the outer layer and the inner opening of the inner layer and through the aperture of the appliance so as to secure the skid assembly to the appliance.

In yet another exemplary aspect, the appliance optionally includes a bracket having an inner side and an outer side opposite the inner side. The bracket defines the aperture of the appliance. And, when the fastener is inserted through the aperture, the at least one anchor element anchors on the inner side of the bracket so as to secure the skid assembly to the appliance.

In yet another exemplary aspect, optionally, the anchor element of the skid assembly is a plurality of anchor elements, and each of the anchor elements have a leading edge and a trailing edge. The leading edge of each anchor element angled toward the head as the anchor element extends outward from the shank, and the trailing edge of each anchor element extending substantially orthogonal to the shank as the anchor element extends outward from the shank.

Variations and modifications can be made to these exemplary aspects of the present disclosure. In addition, these and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a front, perspective view of exemplary skid assemblies supporting an exemplary appliance;

FIG. 2 is an exploded, perspective view of an exemplary skid assembly;

FIG. 3 is a bottom, perspective view of an exemplary assembled skid assembly;

FIG. 4 is a close-up, partial cross-sectional view of an exemplary skid assembly being secured to an exemplary appliance;

FIG. 5A shows a side view of an exemplary fastener;

FIG. 5B is a cross-sectional view taken on line 5B-5B of FIG. 5A;

FIG. 6 is a close-up, partial cross-sectional view of an exemplary skid assembly being secured to an exemplary appliance; and FIG. 7 shows exemplary skid assemblies being removed or displaced from an exemplary appliance.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a front, perspective view of skid assemblies 100 configured to support and protect an appliance 200 during assembly, storage, and transport according to an exemplary embodiment of the present disclosure. In this example, appliance 200 is a refrigerator appliance. Although appliance 200 is shown as a refrigerator, it will be understood that appliance 200 is depicted and described for example purposes only and that appliance 200 may be any suitable appliance. For example, appliance 200 could be a freezer, dishwasher, stove, washer, dryer, or other types of refrigerators. Moreover, the present disclosure and appended claims are not limited to appliances. Skid assemblies 100 could support and protect other objects as well.

Appliance 200 defines a vertical direction V, a transverse direction T, and a lateral direction L. The vertical direction V, transverse direction T, and lateral direction L are mutually perpendicular and form an orthogonal direction system. A housing 201 of appliance 200 extends between an upper portion 202 and a lower portion 204 along the vertical direction V. Housing 201 of appliance 200 also extends between a first side portion 205 and a second side portion 207 along the lateral direction L. Furthermore, housing 201 extends between a front portion 209 and a rear portion 211 along the transverse direction T. In this respect, housing 201 of appliance 200 defines a volume 203.

Appliance 200 includes a plurality of sides 206 (e.g., a top, bottom, front, back, and sides) defined between a plurality of edges 208. During assembly, storage, and shipping of the appliance 200, skid assemblies 100 can support and protect sides 206 and/or edges 208 of appliance 200. Skid assemblies 100 can accommodate any edge 208 or side 206 or both (i.e., any portion 210) of appliance 200. By way of example, as shown in FIG. 1, skid assemblies 100 are configured to accommodate various top and bottom edges 208 of appliance 200, as well as portions of sides 206 near the noted edges.

FIG. 2 is an exploded, perspective view of an exemplary skid assembly 100. Skid assembly 100 includes an inner layer 102 and an outer layer 104. Inner layer 102 is constructed from a low density material and outer layer 104 is constructed from a high density material. When assembled, inner layer 102 is adhered to outer layer 104 by an adhesive, glue, or both, for example. In this manner, low density material inner layer 102 provides cushioning for appliance 200, while high density material outer layer 104 provides rigidity and strength to skid assembly 100. In another exemplary embodiment, inner layer 102 and outer layer 104 may be formed integrally with one another (i.e., of a single piece).

Inner layer 102 includes a first side 106 and a second side 108 opposite first side 106 along vertical direction V. Inner layer 102 is a low density expanded polystyrene material in this embodiment. First side 106 is configured to contact appliance 200 and accommodate portion 210 of appliance 200 (or a portion of some object being protected). In particular, the complex geometry 110 of first side 106 may be complementary to the portion 210 of appliance 200 that it is designed to accommodate such that a tight fit between the two can be made. For example, first side 106 may include various protrusions and recessed areas, among other geometric shapes, that are complementary to the contour of portion 210 of appliance 200. Alternatively, first side 106 may be substantially planar. A combination of a planar construction and complementary features may also be used.

Second side 108 of inner layer 102, the side opposite first side 106, is shown substantially planar with the transverse direction T and lateral direction L such that second side 108 can sit flush onto outer layer 104.

Outer layer 104 includes a first side 112 and a second side 114. Outer layer 104 is an oriented strand board in this exemplary embodiment. By way of example, an oriented strand board may contain multiple oriented particles of e.g., wood compressed together with adhesives.

First side 112 is substantially planar with transverse direction T and lateral direction L and is configured to be in mating communication or complementary fit with second side 108 of inner layer 102. In particular, first side 112 of outer layer 104 is adhered to second side 108 of inner layer 102. In other embodiments, first side 112 is not substantially planar, may include other shapes, and is complementary to the shape of second side 108 of inner layer 102. As an example, second side 108 could be an arcuate shape and first side 112 of outer layer 104 may have a complementary shape.

Second side 114 of outer layer 104 is shown substantially planar with transverse direction T and lateral direction L. Where second side 114 is substantially planar with transverse direction T, numerous benefits may be realized. For instance, skid assemblies 100 supporting and protecting appliance 200 can be placed flat on the ground or a conveyor belt (not shown), appliance 200 (supported by the skid assemblies 100) can be more easily and readily stacked on top of one another, and various shipping vehicles, such as lift trucks, can more easily engage and stabilize the skid assemblies 100 and appliance 200. In other embodiments, second side 114 is not substantially planar with transverse direction T and lateral direction L. As an example, second side 114 could be a generally arcuate shape or U-shaped along e.g., vertical direction V. Other shapes may be used as well.

In one exemplary embodiment of the present disclosure, inner layer 102 is constructed of a low density material and outer layer 104 is constructed of a medium to high density material. Exemplary low density materials include but are not limited to: low density expanded polystyrene, polyurethane, polyethylene, expanded paper-based materials, honeycomb materials, and cork. In one exemplary respect, low density materials may range in density from about 1.5 up to about 3.5 lb/ft$^3$ (24 up to about 56 kg/m$^3$). Exemplary medium to high density materials include but are not limited to: oriented strand board, plywood, high density expanded polystyrene, polypropylene, other high density foams/plastics, paper board, wood, and kraft paper. In one exemplary respect, medium to high density materials may range in density from about 4 up to about 54 lb/ft$^3$ (64 up to about 865 kg/m$^3$). It will be appreciated that other ranges for the low density material and the medium to high density materials are contemplated as well. In each embodiment of the invention, outer layer 104 is constructed from a material having a higher density than inner layer 102.

Referring still to FIG. 2, in this exemplary embodiment outer layer 104 defines one or more outer openings 116 extending through outer layer 104. Outer openings 116 extend through outer layer 104 along vertical direction V. Inner layer 102 defines one or more inner openings 118 extending through inner layer 102 along the vertical direction V. Outer openings 116 of the outer layer 104 are configured to be aligned with inner openings 118 of the inner layer 102 along vertical direction V. Outer openings 116 and inner openings 118 are configured to receive a fastener 120 (FIG. 3).

FIG. 3 shows a bottom, perspective view of an assembled skid assembly 100. As shown, inner layer 102 is adhered to outer layer 104. Skid assembly 100 has a length L1, a width W1, and a thickness T1. The length L1 of skid assembly 100 extends generally along the transverse direction T, the width W1 extends generally along the lateral direction L, and the thickness T1 extends generally along the vertical direction V.

For this exemplary embodiment, skid assembly 100 includes two outer layer portions 104a and 104b and a single piece inner layer 102. Inner layer 102 includes a pair of lateral members 128 that extend in the lateral direction L between a pair of transverse members 102a and 102b that extend in the transverse direction T. The lateral members 128 and transverse members 102a, 102b define a space 129 therebetween.

Skid assembly 100 includes one or more extension portions 130. The extension portion 130 is a portion of the skid assembly 100 where outer layer 104 extends further than inner layer 102 along at least one of length L1 and width W1 of skid assembly 100. Stated alternatively, the extension portion 130 is a portion of the skid assembly 100 where outer layer 104 extends further than inner layer 102 along lateral direction L, transverse direction T, or both. By way of example, the amount of such extension is denoted with letter $E_L$ in FIG. 1 for the lateral direction and $E_T$ in FIG. 6 for the transverse direction. One or more such extension portions 130 allow for skid assembly 100 to be "kicked off" or displaced from appliance 200 by kicking or pushing on the high density material outer layer 104, as opposed to kicking or pushing the low density material inner layer 102 to remove the skid assembly 100 from appliance 200. In this way, inner layer 102 is not damaged during the removal process.

In one exemplary embodiment, extension portion 130 of skid assembly 100 extends along both length L1 and width W1 of the skid assembly 100 so that skid assembly 100 can be kicked off or displaced from appliance 200 regardless of the side of the appliance 200 in which the skid assembly 100 is removed from appliance 200.

Exemplary skid assembly 100 has four outer openings 116, with two outer openings 116 per outer layer portions 104a, 104b. As shown, inner layer 102 is shown protruding into each outer opening 116. More particularly, second side 108 of inner layer 102 has bosses 132 projecting or protruding substantially into each outer opening 116.

As shown in more detail in FIG. 4, which is a cross-sectional view of an exemplary skid assembly 100 secured to exemplary appliance 200, inner openings 118 extend through each boss 132 (and through the entirety of inner layer 102). Fasteners 120 can be pressed or inserted into each outer opening 116 and into each inner opening 118. More particularly, in this embodiment, fastener 120 is pressed vertically into outer opening 116, inner opening 118, and through an aperture 216 defined by appliance 200. Specifically, a bracket 218 of appliance 200 defines aperture 216 and fastener 120 extends through the aperture 216 of bracket 218.

Appliance 200 is shown having at least one aperture 216 for anchoring skid assembly 100 to appliance 200. However, it will be appreciated that appliance 200 may have more than one aperture 216 for receiving fasteners 120 and that skid assembly 100 may have corresponding outer and inner openings 116, 118. In other embodiments, appliance 200 defines at least one aperture 216 in or along a side 206 or edge 208 of appliance 200. For instance, aperture 216 may be positioned along the bottom side or top side of appliance 200.

Referring now to FIGS. 4 and 5A, fastener 120 has a head 134 and a shank 136 extending substantially orthogonal to head 134. Shank 136 includes a tip portion 138 disposed opposite head 134. Shank 136 extends through inner opening 118 of inner layer 102, while head 134 is pressed flush with a boss end 140. Boss end 140 is the face or the end of boss 132. Fastener 120 has a plurality of anchor elements 142 (also referred to as "branches") that extend outwardly from, and perpendicular to, shank 136 of fastener 120. Anchor elements 142 may extend completely around shank 136 or may be divided circumferentially into parts or columns. In some embodiments, one or more anchor elements 142 may extend at non-orthogonal angles from shank 136.

For this exemplary embodiment, fastener 120 is a bolt or skid bolt made of plastic. A plastic fastener may more easily be de-anchored when skid assembly 100 is "kicked off" or displaced from appliance 200. The stiffness of the plastic allows for anchor elements 142 to more easily deform for de-anchoring or for easing the fastener 120 through aperture 216. In alternative exemplary embodiments, shank 136 is made of steel and anchor element 142 is made of plastic. In this respect, the shank 136 is rigid but maintains the elastic flexibility for anchor elements 142. As an example, anchor elements 142 can be made of semi-rigid plastic materials, such as nylon, or the like.

Anchor elements 142 of fastener 120 interact with bracket 218 so as to secure skid assembly 100 to appliance 200. Bracket 218 of appliance 200 includes an outer side 219 and an inner side 220 opposite the outer side 219. The outer side 219 contacts the first side 106 of the inner layer 102. The inner side 220 may contact the appliance 200 or may not be in contact with the appliance or other object. If the inner side 220 contacts the appliance 200, it will be appreciated that sufficient room or space in the vertical direction V must be present for fastener 120 to extend through aperture 216 such that fastener 120 may anchor skid assembly 100 to appliance 200. For example, appliance 200 may define a hole or recess (not shown) extending in the vertical direction V and aligned with aperture 216 to provide sufficient clearance for fastener 120 to be inserted through the aperture 216. Bracket 218 may also include a wheel assembly 222 for rolling the appliance 200 for transport and a leveler 224 for adjusting or leveling appliance 200 along the vertical direction V once appliance is positioned in place.

Referring now specifically to FIG. 5A, exemplary fastener 120 has a shank 136 that extends substantially orthogonal from head 134. Head 134 extends in the vertical direction V between an outer side 135 and an opposing inner side 137. A circumferential side 139 connects the outer side 135 and the inner side 137 and includes a radiused portion 141 where circumferential side 139 connects with outer side 135. The outer side 135 is configured to be struck, forced, and/or pressed by e.g., pneumatic hammer 144 or other press device. The inner side 137 is pressed against boss end 140 of boss 132 (FIG. 4) when fastener 120 is pressed or forced into inner opening 118 of inner layer 102, or alternatively, the inner side 137 of head 134 is pressed or forced against second side 108 of inner layer 102 (FIG. 6).

Referring to FIGS. 5A and 5B, for this exemplary embodiment, shank 136 defines four faces arranged about shank 136. Two lateral faces 147 extend along the vertical direction V and the lateral direction L in a substantially parallel manner. Two transverse faces 149 extend along the vertical direction V and the transverse direction T in a substantially parallel manner. The transverse faces 149 are connected with and positioned substantially orthogonal to the lateral faces 147 by radiused edges 151. Radiused edges 151 better allow fastener 120 to be inserted in the inner opening 118 and aperture 216 more easily. In other embodiments, shank 136 may have a cylindrical portion (not shown) extending along the vertical direction V and circumferentially about a longitudinal centerline 154 of fastener 120 in which the anchor elements 142 extend outwardly from the cylindrical portion.

For this exemplary embodiment, anchor elements 142 of fastener 120 are constructed as plurality of branches extending outwardly from shank 136. Anchor elements 142 have different configurations and include shorter, locator branches 150 extending outwardly from shank 136 and longer, anchor branches 152 extending outwardly from shank 136. Anchor branches 152 are positioned between head 134 and locator branches 150. Fastener 120 has a plurality of both locator branches 150 and anchor branches 152. In one exemplary embodiment, fastener 120 has at least one of locator branches 150 and anchor branches 152.

As shown, anchor branches 152 extend outwardly from shank 136 a greater distance than locator branches 150. Locator branches 150 are configured to assist an operator with locating fastener 120 with aperture 216, as well as locating fastener 120 with inner opening 118. As such, locator branch 150 is configured to extend outwardly a distance d1 from longitudinal centerline 154 of fastener 120. Distance d1 may be approximately equal to or slightly less or more than the radius of aperture 216, for example.

The present invention is not limited to the particular construction of fastener 120 shown and other types may be used as well. For example, fasteners 120 could be constructed with anchor elements that include toggle wings, detent pins, toggle bolts, anchoring device, expansion bolts, ribs, and/or other types of branches. Additionally, anchor elements 142 could be any suitable combination of the named examples.

Anchor branches 152 are configured to anchor fastener 120 with inner side 220 disposed about aperture 216 of bracket 218 (or a like part of appliance 200). Anchor branch 152 extends outwardly a distance d2 from longitudinal centerline 154 of fastener 120. Distance d2 is greater than distance d1 and is greater than the radius of aperture 216. In this way, fastener 120 is pressed or inserted through aperture 216 in a "press fit" or interference fit manner. For anchor element 142 to extend through aperture 216, anchor elements 142 are made of a flexible, semi-rigid material such that anchor elements 142 may bend when inserted through aperture 216 and then extend outwardly to "catch" or anchor the fastener 120 on or with inner side 220 of bracket 218 disposed about aperture 216.

To better ease the fastener 120 through aperture 216 of appliance 200, a leading edge 156 of each anchor branch 152 may be angled toward head 134 as anchor branch 152 extends outward from shank 136 as shown in FIG. 5A. In other embodiments, although not shown, leading edge 156 of anchor branch 152 can be oriented substantially parallel with lateral direction L (or transverse direction T, depending on the face from which anchor element 142 extends).

As also shown in FIG. 5A, trailing edge 158 can be oriented substantially parallel with lateral direction L (or transverse direction T, depending on the face from which anchor element 142 extends). Moreover, although not shown, a trailing edge 158 of anchor branch 152 may likewise be angled toward head 134 as anchor branch 152 extends outward from shank 136. In this way, anchor branch may better frictionally engage support surface 220. Anchor locators 150 may be oriented in the same manner as any of the embodiments described above with respect to the anchor branches 152.

It will be appreciated that altering various properties or elements of the anchor elements 142 will impact the anchoring force of fastener 120. Such properties or elements include but are not limited to the type of anchor element, the material of the anchor element and its mechanical properties, the angle of the leading edge 156 and/or trailing edge 158, and the amount of surface area the anchor element frictionally engages the inner side 220 of bracket 218.

FIG. 4 depicts fastener 120 positioned in one embodiment of skid assembly 100 while FIG. 6 depicts fastener 120 being pressed into another exemplary embodiment of skid assembly 100. In each embodiment, fastener 120 secures skid assembly 100 to appliance 200 in the following exemplary manner. Fastener 120 is pressed in the vertical direction V into outer opening 116 of outer layer 104, in inner opening 118 of inner layer 102, and through aperture 216 of bracket 218. Fastener 120 can be pressed by a pneumatic hammer 144 or other press device, for example. When fastener 120 is pressed in the vertical direction V, shown by vertical force arrow 146 in FIG. 6, head 134 of fastener 120 compresses low density material inner layer 102 against appliance 200, ensuring a secure fit between the two.

In the exemplary embodiment of FIG. 4, head 134 of fastener 120 compresses boss end 140 of boss 132 along the vertical direction V such that inner layer 102 is compressed along its thickness and pressed against appliance 200. Boss 132 provides inner layer 102 with additional thickness, and thus additional material to compress. The additional low density material may provide for better securement of skid assembly 100 to appliance 200 as well as better cushioning support for appliance 200 during assembly, storage, and transport.

In the exemplary embodiment of FIG. 6, inner layer 102 does not include boss 132 protruding into outer layer 104. Rather, head 134 of fastener 120 compresses the second side 108 of inner layer 102 disposed about the inner opening 118. For this embodiment, second side 108 is planar with the location in which the inner layer 102 and the outer layer 104 are in mating communication. For this example, fastener 120 presses further upward in the vertical direction V (assuming the same amount of pressing force is used) into inner layer 102 and tip portion 138 of fastener 120 would extend further upward through aperture 216 of appliance 200 (assuming a fastener of the same length) in comparison with the embodiment of FIG. 4 where inner layer 102 has a boss 132 protruding into outer opening 116. It will be appreciated that the inclusion of boss 132 allows for a greater thickness of material to be compressed and that fastener 120 need not extend quite as far upward through aperture 216 (when comparing fasteners of the same length) as compared with the embodiment of FIG. 6. In one aspect, however, where inner layer 102 does not include a boss 132 protruding into outer layer 104, fasteners having a shorter length may be used.

Referring now to FIGS. 4 and 6, when fastener 120 is pressed in the vertical direction V, tip portion 138 of fastener 120 extends through aperture 216 of bracket 218. Once tip portion 138 extends through aperture 216, anchor elements 142 frictionally engage inner side 220 of bracket 218 disposed about aperture 216 to anchor fastener 120 to appliance 200.

To resist disengagement of fastener 120 from inner side 220 of bracket 218 during assembly, storage, and transport of appliance 200, anchor elements 142 provide an anchor force sufficient to secure the skid assembly 100 to appliance 200. However, for ease of "kicking off" or displacing the skid assembly 100 from appliance 200, preferably the anchoring force is selected so as to allow for displacement of skid assembly 100 from appliance 200 without the use of tools. In other words, the stiffness of the anchoring elements 142 are preferably selected so as to secure skid assembly 100 to appliance during assembly, storage, and transport yet allow for an operator to disengage the skid assembly 100 from appliance 200 without the use of tools.

FIG. 7 shows exemplary skid assemblies 100 being removed or displaced from exemplary appliance 200. More specifically, exemplary appliance 200 is being tilted such that skid assemblies 100 can be "kicked off" or displaced away from appliance 200 without the use of tools.

Skid assemblies 100 can be displaced from appliance 200 in the following exemplary manner. First, appliance 200 is pushed in lateral direction L, as shown by lateral force 160, to tilt appliance 200. Once appliance 200 is sufficiently pushed over or tilted, a downward force 162 is applied to skid assembly 100. For example, skid assembly 100 can be kicked downward. More particularly, a downward force 162 can be applied to extension portion 130 of skid assembly 100. Thus, downward force 162 only need be applied to the high density material outer layer 104. In this way, low density material inner layer 102 can be better preserved for future use.

Additionally, because skid assembly 100 can be kicked off or displaced by simply kicking or pressing the skid assembly 100 downward, appliance 200 need not be laid on its side or against other objects, as the tilt necessary to displace skid assembly 100 from appliance 200 is minimal. Moreover, because the inner layer 102 and outer layer 104 are adhered or bonded together, skid assembly 100 is more easily displaced from appliance 200 and the cleanup of skid assembly 100 is made easier, as the assembly remains intact after being displaced from appliance 200.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An appliance including a skid assembly, comprising:
   an appliance housing defining a volume;
   the appliance defining an aperture for anchoring the skid assembly to the appliance; and
   the skid assembly, comprising:
   an inner layer comprised of a low density material and having a first side and a second side opposite the first side, the first side configured to contact the appliance and shaped to accommodate a portion of the appliance, the inner layer defining an inner opening extending through the inner layer and aligned with the aperture of the appliance;
   an outer layer comprised of a high density material and having a first side and a second side opposite the first side of the outer layer, the outer layer defining an outer opening extending through the outer layer and aligned with the inner opening, the outer layer adhered to the second side of the inner layer;
   a fastener comprising:
   a head having an inner side and an opposing, outer side;

a shank extending from the head; and
at least one anchor element extending outwardly from the shank;
wherein the fastener is positioned in the outer opening of the outer layer and the inner opening of the inner layer with the inner side of the head in contact with the inner layer, the inner side pressed against the inner layer and not pressed against the outer layer, whereby the shank extends through the aperture of the appliance so as to secure the skid assembly to the appliance.

2. The appliance of claim 1, wherein the appliance further comprises a bracket having an inner side and an outer side opposite the inner side, the bracket defining the aperture of the appliance; and
wherein, when the fastener is inserted through the aperture, the at least one anchor element anchors on the inner side of the bracket so as to secure the skid assembly to the appliance.

3. The appliance of claim 1, wherein the at least one anchor element is a plurality of anchor elements.

4. The appliance of claim 3, wherein the shank of the fastener defines a vertical direction, a lateral direction, and a transverse direction arranged mutually perpendicular to one another, the shank further comprising:
lateral faces extending along the vertical direction and the lateral direction of the shank and arranged substantially parallel to one another;
transverse faces extending along the vertical direction and the transverse direction of the shank and arranged substantially parallel to one another, the transverse faces connected with and positioned substantially orthogonal to the lateral faces; and
wherein the plurality of anchor elements extend from each of the lateral and transverse faces.

5. The appliance of claim 1, wherein the plurality of anchor elements each have a leading edge, the leading edge angled toward the head as the anchor element extends outward from the shank.

6. The appliance of claim 1, wherein the plurality of anchor elements each have a leading edge and a trailing edge, the leading edge of each anchor element angled toward the head as the anchor element extends outward from the shank, and the trailing edge of each anchor element extending substantially orthogonal to the shank as the anchor element extends outward from the shank.

7. The appliance of claim 1, wherein the inner layer has a boss projecting substantially into the outer opening.

8. The appliance of claim 7, wherein the inner layer defines a boss with a face, the boss projecting substantially into the outer opening with the inner side of the head of the fastener contacting the face of the boss and compressing the inner layer.

* * * * *